Feb. 23, 1954 F. P. STROTHER Re. 23,790

METHOD AND MEANS FOR CONTROL OF INDEPENDENTLY VARIABLE CHARACTERISTICS

Original Filed Jan. 22, 1948 6 Sheets-Sheet 1

INVENTOR
FRED P. STROTHER
BY
ATTORNEY

INVENTOR
FRED P. STROTHER
BY
Norman Armstrong
ATTORNEY

INVENTOR
FRED P. STROTHER
BY
ATTORNEY

INVENTOR
FRED P. STROTHER
BY
ATTORNEY

Feb. 23, 1954 F. P. STROTHER Re. 23,790

METHOD AND MEANS FOR CONTROL OF INDEPENDENTLY VARIABLE CHARACTERISTICS

Original Filed Jan. 22, 1948 6 Sheets-Sheet 5

INVENTOR
FRED P. STROTHER
BY
ATTORNEY

INVENTOR
FRED P. STROTHER
BY
ATTORNEY

Reissued Feb. 23, 1954

Re. 23,790

UNITED STATES PATENT OFFICE 23,790

METHOD AND MEANS FOR CONTROL OF INDEPENDENTLY VARIABLE CHARACTERISTICS

Fred P. Strother, Shawmut, Ala., assignor to Deering Milliken Research Trust, New York, N. Y., a nonprofit trust of New York Original No. 2,612,743, dated October 7, 1952, Serial No. 3,776, January 22, 1948. Application for reissue August 11, 1953, Serial No. 373,703

39 Claims. (Cl. 57—38.3)

Matter enclosed in heavy brackets [ ] appears in the original patent but forms no part of this reissue specification; matter printed in italics indicates the additions made by reissue.

The present invention relates to control methods and means and more particularly to methods and means for obtaining novel effects, such as, novel characteristics of a fabricated article or novel sequence of events. Specifically the invention comprises a method and means for converting randomly occurring pulses into useful control signals of random occurrence and of random duration or magnitude, or of both random duration and random magnitude. The control system of the invention is particularly adapted for use in the production of yarn having slubs of random dimensions at random intervals therein, as signals produced in accordance with the invention may be used to control, not only the spacing between the slubs, but also the lengths and diameters of the slubs. Other useful applications of the control system of the invention will become apparent as the description proceeds.

In general the control signals produced in accordance with the invention may be used for random control of two or more independently variable characteristics of one, or of several, elements. For example, the signals may control the rates of travel of elements, the times during which they travel and their directions of travel, or the signals may control the orientation of elements, their actuation, and their functioning when actuated.

For a better understanding of the invention and of specific controls systems embodying the same, reference may be had to the accompanying drawings of which:

Figure 1:
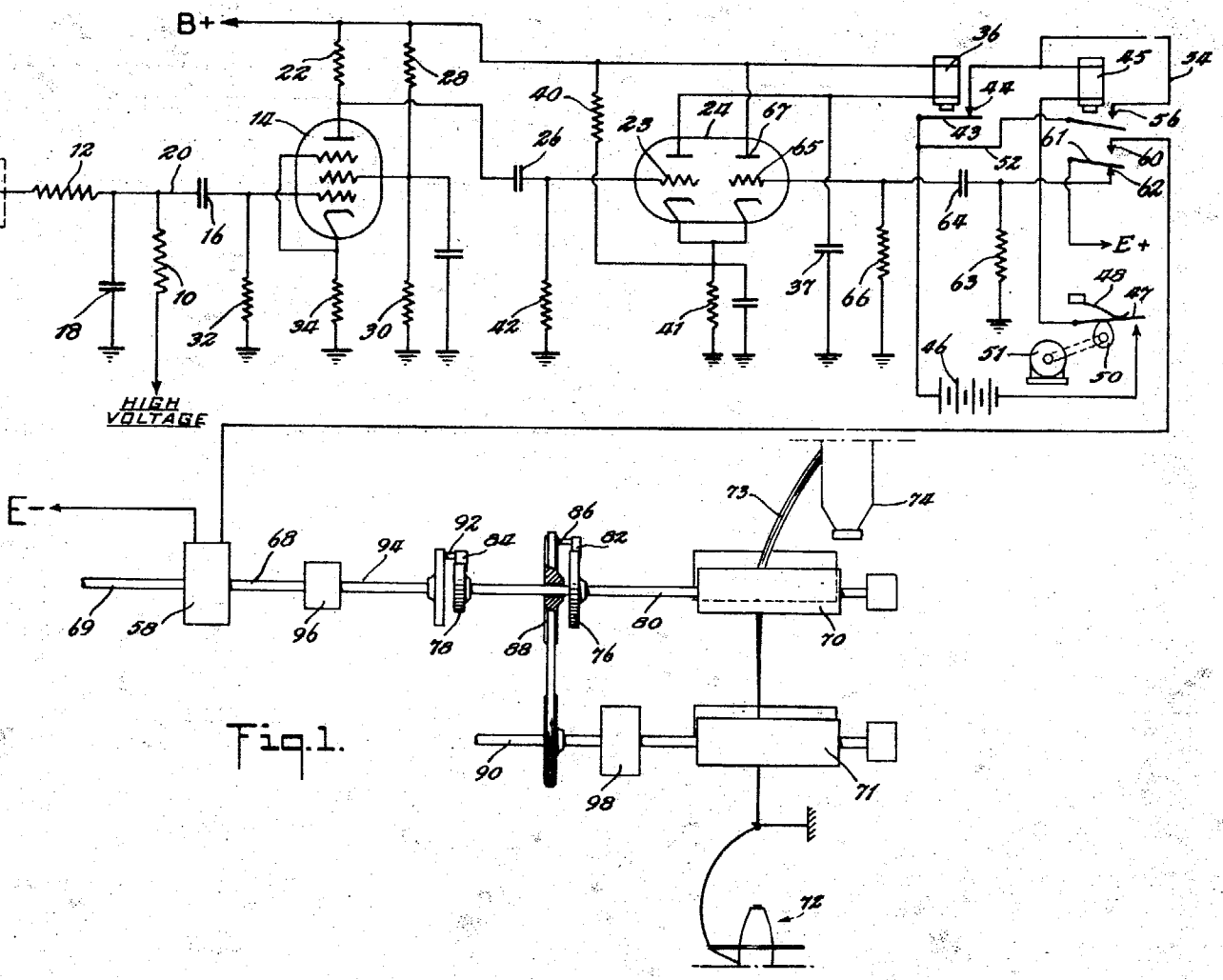
Fig. 1 is a diagram illustrating a specific embodiment of the invention wherein control signals of random duration and produced at random intervals control slub injecting mechanism.

In Fig. 1 pulses delivered by a counter tube as a result of random penetration by cosmic or other radiation are amplified and converted into control signals of random duration. The draft of a yarn spinning and drafting mechanism is decreased through appropriate apparatus controlling the rate of rotation of the feed rolls for the duration of each control signal. Yarn produced by the spinning mechanism thus has random length slubs at random intervals therein, the intervals between slubs corresponding to the intervals of time between consecutive control signals and the lengths of the slubs corresponding to the periods of duration of the control signals.

The counter tube, indicated at 2, may be a conventional Geiger-Müller counter tube comprising a grounded and air tight cylindrical member 4 containing argon or other inert gas at low pressure and a wire electrode 6 extending along the axis of the cylinder 4 and suitably insulated therefrom. A lead shield 8 of suitable thickness is provided about the counter 2. The electrode 6 of the counter is connected to a source of high voltage through a high resistance 10 and a resistor 12 and the junction of resistors 10 and 12 is connected to the control grid of a pentode 14 through a capacity 16. A pulse lengthening condenser 18 is connected between ground and the lead 20 connecting resistor 12 and capacity 16. The anode of pentode 14 is connected to a source of positive potential, indicated as B+ through a resistor 22, and to one control grid 23 of a double triode 24 through a condenser 26. The screen grid of pentode 14 is maintained at a suitable positive potential, as by connection to the junction of resistors 28 and 30 serially connected across the source of potential. Biasing resistors 32 and 34 are provided for the control grid and cathode, respectively, of the pentode 14. The plate of tube 24, controlled by grid 23, is connected to B+ through the winding of a relay 36 and to ground through a condenser 37. The cathodes of tube 24 are tied together and given a positive bias by connection to the junction of resistors 40 and 41 connected in series across the source of potential. A resistor 42 is connected between the control grid 23 and ground.

The circuit so far described provides a means for obtaining energization of relay 36 at random intervals corresponding to random discharge of counter tube 2 as a result of penetration by cosmic or other radiation, as hereinafter described. In accordance with the invention, the energization of relay 36 at random intervals is utilized to initiate control signals at random intervals and of random duration. For this purpose, relay 36 controls, through its armature 43 and a front contact 44, an intermediate circuit including a holding relay 45 and a source of direct current 46. A switch arm 47, biased to closed position by a spring 48 and interposed in the intermediate circuit between the source 46 and the winding of relay 45 is intermittently opened by a cam 50, cam 50 being rotated at a constant, relatively slow, rate by any suitable means, indicated as a motor 51, and being shaped to open the switch 47 once during each revolution. A circuit including leads 52 and 54 and front contact 56 of relay 45 bridges the armature 43 and front contact 44 so as to maintain relay 45 energized after deenergization of relay 36 and until the circuit is opened at switch 47 by the rotating cam 50. Thus, the duration of energization of relay 45 will depend upon the angular position of the cam 50 at the moment of energization of relay 36, the average period of duration depending upon the dimensions of the cam and upon the rate of rotation thereof.

In the particular embodiment of the invention illustrated in Fig. 1, relay 45, when energized, closes the circuit of a magnetic clutch 58 over a front contact 60, the cooperating armature 61 of the relay being connected to the positive terminal of a suitable source of energy indicated by E+, and the winding of the magnetic clutch being connected between front contact 60 and the negative terminal of the source, indicated by E−. A back contact 62 associated with armature 61 is connected to ground through a bleed resistor 63 and, through a condenser 64, with the other control grid 65 of double triode 24, grid 65 being connected to ground through a resistor 66. The associated anode 67 of the tube 24 is tied directly to B+.

Magnetic clutch 58, when energized, couples a shaft 68 to a drive shaft 69, and such coupling results in a reduction of the draft of a yarn spinning mechanism.

The yarn spinning mechanism is diagrammatically illustrated as comprising a pair of feed rolls 70, a pair of draft rolls 71, and a conventional ring spinner 72. The rolls 70 draw roving 73 from one or a plurality of supply bobbins 74 and feed it into the ratch defined by the two pairs of rolls, where it is drafted by the rapid rotation of the draft rolls 71. The drafted fibers, upon emission from the draft rolls are spun into yarn by the ring spinner 72. As is well known, the diameter of yarn spun from any roving on a given spinning mechanism may be varied by varying the draft of the mechanism, that is, by varying the ratio of the peripheral speed of the draft rolls to that of the feed rolls, decrease in draft resulting in increase in yarn diameter. Thus, by temporary increase in feed roll speed in response to energization of magnetic clutch 58, slubs are injected into the yarn. In Fig. 1 such increase in feed roll speed is obtained through the use of a pair of overriding clutches, indicated diagrammatically as comprising ratchet wheels 76 and 78 on the shaft 80 of the driven feed roll and their respective driving pawls 82 and 84. Pawl 82 is mounted on an arm 86 integral with a sprocket 88 rotatably mounted on the shaft 80 and chain driven from the main drive shaft 90 of the spinning mechanism. Pawl 84 is carried by an arm 92 secured to a shaft 94 for rotation therewith; shaft 94 being coupled, through suitable multiplication gearing, indicated diagrammatically at 96, with shaft 68. The draft rolls 71 are driven from drive shaft 90 through multiplication gearing indicated diagrammatically at 98.

In the operation of the system of Fig. 1, when cosmic or other radiation penetrates the counter tube 2 and ionizes the gas therein a transient discharge occurs between electrode 6 and the grounded cylinder 4. The grid of pentode 14 is swung sufficiently negative by the transient current to cause deenergization of the pentode. Deenergization of the pentode 14 causes a sudden rise in potential of the grid 23 of tube 24 with consequent energization of that half of the tube and of relay 36. Energization of relay 36, providing switch 47 is closed, closes the circuit of relay 45 causing that relay to pick up its armatures to close its holding circuit over front contact 56 and to close the circuit of the magnetic clutch 58 over front contact 60. Relay 45 and magnetic clutch 58 will remain energized after deenergization of relay 36 until the circuit of relay 45 is opened at switch 47 by cam 50. During such period of energization of the magnetic clutch 58, ratchet wheel 78 will be driven through its pawl 84 and its rate of rotation will be greater than that of sprocket 88. Consequently, the teeth of ratchet wheel 76 will slide under the pawl 82 and the rate of rotation of shaft 80 will be increased. The resulting increased rate of rotation of the feed rolls and consequent reduction in draft will cause a slub to be injected into the yarn, the length of which will depend upon the duration of the control signal, that is, upon the period of energization of the magnetic clutch 58, and the diameter of which will depend upon the rate of rotation of the shaft 69. As the clutch is energized at random intervals in response to pulses originating in the counter 2, and for random periods of duration, as a result of the rotation of cam 50, the slubs injected into the yarn by the above described control system of Fig. 1 will occur at random intervals and will be of random length. The circuit provides sufficient time for release of the magnetic clutch between successive periods of energization of relay 45 as when relay 45 releases and armature 61 engages back contact 62, a positive pulse from the source E+ is impressed on the control grid 65 causing a transient current through that half of the double triode, and thereby raising the cathode potential and thus preventing energization of the other half of the tube for a time sufficient for release of the magnetic clutch.

The optimum dimensions of the counter tube 2 and of the lead sheath 8 will depend upon the radiation to which it is to be exposed and upon the desired average frequency of discharge of the counter, which in turn depends largely upon the mechanism to be controlled. In the case of slub injection, the desired average frequency will depend upon the rate of yarn production of the spinning mechanism. As the rate of emission per unit weight and the penetrating powers of the radiations of radioactive materials are known, as is also the average frequency of incidence of cosmic rays, suitable dimensions of the counter for any desired average number of pulses may be readily calculated. Preferably the counter tube 2 of Fig. 1 is dimensioned for actuation by cosmic rays as, when advantage is taken of cosmic rays, the use of relatively expensive radioactive materials is avoided. The circuit of Fig. 1 with a cosmic ray actuated and properly shielded counter tube of about six inches in length and having a diameter of one and one-quarter inches has been found to operate particularly satisfactorily to produce control pulses at an average rate suitable for random slub injection.

Figure 2:
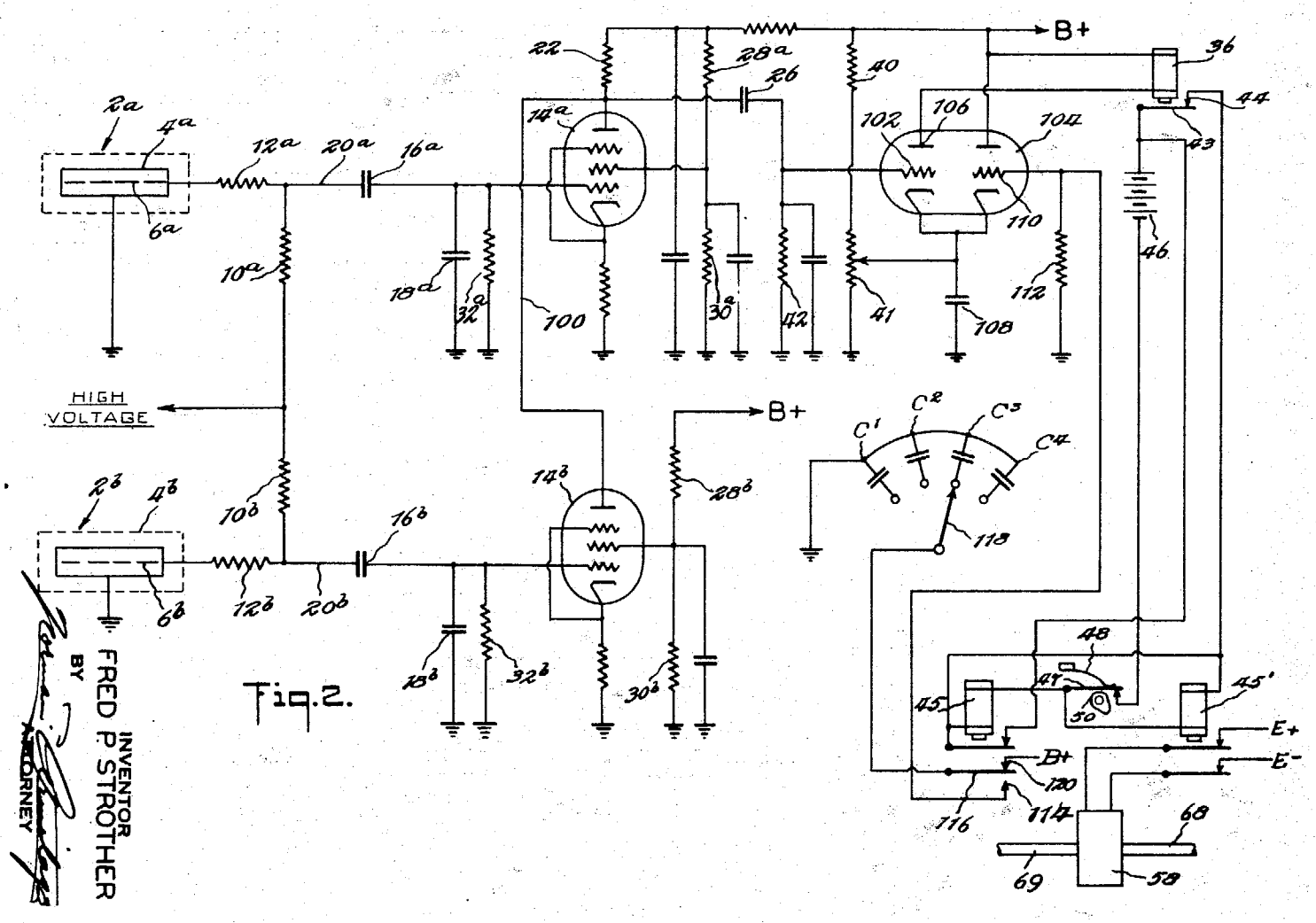
Fig. 2 is a diagram illustrating a modification of the invention wherein means are provided for adjusting the minimum interval between the random control signals.

If it is desired to provide an adjustable minimum interval between control signals and to change the overall average rate of occurrence of control signals without substitution of a counter tube of different dimensions, the circuit of Fig. 2 may be employed. In this embodiment of the invention relay 36 controlling the intermediate circuit is energized in response to coincident discharges of two counter tubes, 2a and 2b and adjustable means are provided for preventing reenergization of relay 36 for a predetermined interval after deenergization of the holding relay 45. In Fig. 2, as the circuits of both counter tube 2a and counter tube 2b are like that of tube 2 of Fig. 1, the elements thereof are identified by the same reference numbers as those used to identify like elements in Fig. 1, the subscripts "a" and "b" being added to the reference numbers for the elements of the respective circuits of tubes 2a and 2b. The plate of pentode 14a in the circuit of counter 2a and the plate of pentode 14b in the circuit of counter 2b are tied together by a conductor 100, and are connected to one control grid 102 of a double triode 104 through the condenser 26 so that a positive pulse is transmitted to grid 102 only when both tubes 14a and 14b are coincidently blocked as a result of coincident discharges of counter tubes 2a and 2b. Relay 36 is connected in the circuit of anode 106 of tube 104 controlled by grid 102. The cathodes of tube 104 are connected together and to ground through a condenser 108 and to ground through an adjustable portion of resistor 41; resistor 41 being connected in series with resistor 40 across the source of potential as in the circuit of Fig. 1. The other control grid, 110, of the double triode 104 is connected to ground through a resistor 112 and, through a back contact 114 and armature 116 of the holding relay 45, with a manually adjustable contact arm 118. One plate of each of a plurality of condensers of different capacities, C1, C2, C3, and C4, is grounded and the other plate of each condenser is connected with a different contact engageable by the arm 118. A front contact 120, associated with armature 116 is connected to B+.

With the above described arrangement, assuming arm 118 positioned as shown in Fig. 2, during energization of relay 45, that is, for the duration of a control signal, condenser C3 is charged over armature 116 and front contact 120 of the relay. When switch 47 is opened by cam 50, terminating the control signal, relay 45 is deenergized and drops its armature 116. Condenser C3 thereupon discharges through the circuit including armature 116, back contact 114 and resistor 112. This discharge current raises the potential of control grid 110 and causes current to flow through the corresponding half of double triode 104. The consequent rise of the potential of the cathodes of tube 104 blocks the half of the double triode controlling relay 36 and prevents energization thereof by any pulse from the coincident circuit during the period of discharge of condenser C3. By adjustment of arm 118 any one of four different minimum intervals between control signals, each corresponding to the capacity of a different one of the condensers C1, C2, C3 and C4, may be selected. A greater or a fewer number of condensers could, of course, be provided as desired.

When the circuit of Fig. 2 is used for control of slub injection mechanism of the type of Fig. 1, the circuit of magnetic clutch 58 could be controlled, as in Fig. 1 over top contacts of relay 45. In the particular arrangement of Fig. 2 the circuit of the magnetic clutch 58 is controlled over front contacts of a relay 45', the winding of which is connected in parallel with the winding of relay 45, so as to be energized concurrently therewith. It will be understood that the magnetic clutch 58, when energized, couples shaft 68 to the drive shaft 69 for insertion of a slub into yarn, as heretofore described with reference to Fig. 1, the length of each slub depending upon the duration of the control signal and the intervals between slubs depending upon the periods between the cessation of one control signal and the inception of the next. With the circuit of Fig. 2, however, the average rate of production of control signals may be adjusted by moving the counter tubes 2a and 2b toward or away from each other to increase or decrease, respectively, the probability of coincident discharges as will be understood by those skilled in the art. Also, because of the provision of the condensers C1, C2, C3 and C4, and the circuit associated therewith, adjustment may be made of the minimum interval between control signals, and, therefore, between slubs, when slub injecting mechanism is controlled by the system.

Figure 3:
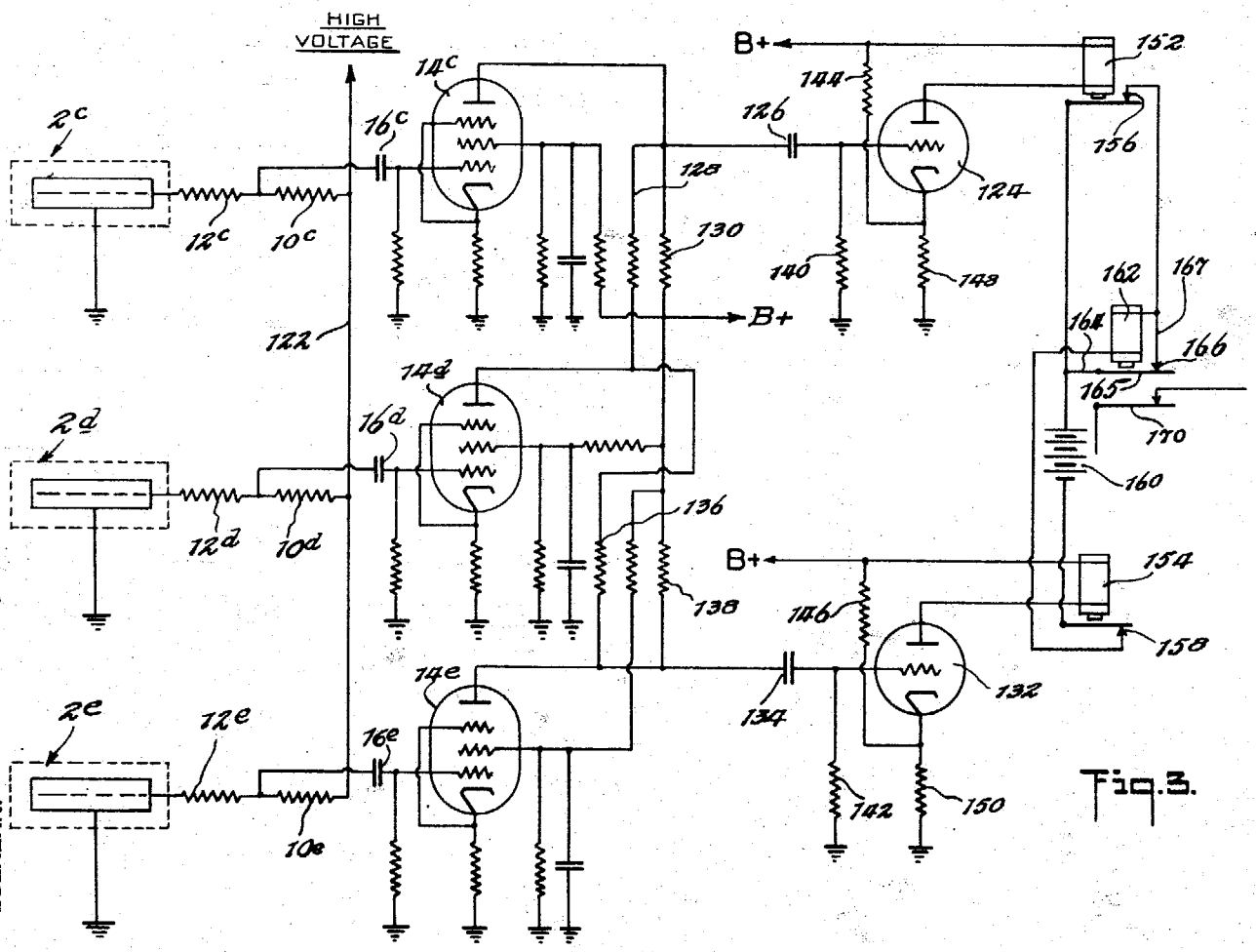
Fig. 3 is a circuit diagram illustrating an alternative arrangement for obtaining control signals of random occurrence and of random duration with the average rate of occurrence and the average duration each being separately adjustable.

Another arrangement for obtaining control signals of random duration and of random occurrence, and one in which the average rate of occurrence and the average duration are separately adjustable is shown in Fig. 3. In this embodiment of the invention three counter tubes 2c, 2d and 2e are employed and connected so that coincident discharges of two, specifically counters 2c and 2d, initiate a control signal while coincident discharges of one of these two, specifically tube 2d, and of the third counter 2e, terminate the signal. Thus, by moving counter tube 2c toward or away from counter tube 2d the average rate of occurrence of control signals may be increased and decreased respectively and similarly by moving counter 2e toward and away from counter 2d the average duration of the control pulses may be decreased and increased, respectively.

As shown in Fig. 3, the ungrounded electrode of the counter tube 2c is connected to the high voltage line 122 through a pair of resistors 12c and 10c, and through resistor 12c and condenser 16c to the control grid of the pentode 14c. Similarly the ungrounded electrode of counter tube 2d is connected to the high voltage line 122 through resistors 12d and 10d and to the control grid of pentode 14d through resistor 12d and condenser 16d and the ungrounded electrode of counter 2e is connected to line 122 through resistors 12e and 10e and to the control grid of pentode 14e through resistor 12e and condenser 16e. The anode of pentode 14c is connected to the control grid of a triode 124 through a condenser 126, is connected to the anode of pentode 14d through a resistor 128 and is connected to B+ through a resistor 130. The anode of pentode 14e is connected to the control grid of a triode 132 through a condenser 134, is connected to the anode of pentode 14d through a resistor 136 and is connected to B+ through a resistor 133. The screen grids of the pentodes are operated at positive potential, as shown, and suitable biasing resistors are provided for the cathodes and control grids.

Biasing resistors 140 and 142 are provided for the control grids of the triodes 124 and 132, respectively. The cathodes of the triodes are connected to B+ through resistors 144 and 146, respectively, and to ground through resistors 148 and 150, respectively. The plate of triode 124 is connected to B+ through the winding of a control signal "start" relay 152 and the plate of triode 132 is connected to B+ through the winding of a control signal "stop" relay 154. Relay 152, over a front contact, 156, and relay 154, over a back contact 158, control an intermediate circuit including a source of electromotive force indicated as a battery 160, and the winding of a holding relay 162. The holding circuit of relay 162 comprises a lead 164 connected between the positive terminal of source 160 and armature 165 of relay 162, front contact 166 associated therewith and a lead 167 connected between contact 166 and the winding of the relay. Relay 162 may, as shown, directly control another circuit over a front contact of a second armature 170, and that circuit may be used for actuation or control of an element at unpredictable intervals and for unpredictable periods. For example, relay 162 may control the circuit of the magnetic clutch of Fig. 1 for insertion of slubs into yarn, or it may be used as hereinafter described in connection with Figs. 4 to 6 in obtaining a control signal varying randomly in magnitude as well as in occurrence and in duration.

The operation of the system of Fig. 3 will be readily apparent from the foregoing description. When only one counter tube, for example counter 2c, is discharged as the result of penetration by cosmic rays, pentode 14c is blocked but pentode 14d remains energized. Resistor 128 is so chosen that the positive pulse transmitted to the control grid of tube 124 under these conditions is insufficient to energize that tube. Similarly if counter tube 2e alone is discharged, blocking of pentode 14e while pentode 14d remains energized, will not energize tube 132. As pentodes 14c and 14e are substantially isolated from each other by the series connected resistors 128 and 136 coincident discharge of counters 2c and 2e will not energize either triode 124 or 132. When, however, counters 2c and 2d are coincidently discharged, both pentodes 14c and 14d are blocked and a positive pulse of sufficient magnitude is impressed upon the control grid of triode 124 to insure energization of that tube and consequent energization of relay 152. Relay 152 then picks up its armature and closes the energizing circuit of holding relay 162, relay 154 being deenergized so that the circuit of relay 162 is completed over back contact 158. When relay 162 is energized it picks up its holding circuit over front contact 166 and hence is not deenergized by subsequent deenergization of relay 152. Relay 162 will remain energized until coincident discharges of counter tubes 2d and 2e cause energization of triode 132 and consequent energization of "stop" relay 154. Thus with the circuit of Fig. 3, both the occurrence and the duration of the control signals depend upon the random reception of coincident pulses. As heretofore indicated, the relative position of the counter tubes may be adjusted to vary either the average occurrence or the average duration, or both, as desired. Although no means are included in the circuit of Fig. 3 for insuring a minimum period between control signals, obviously the condenser arrangement described in connection with Fig. 2 could be added, if desired, to prevent energization of tube 124 for a predetermined period after deenergization of the holding relay 162.

Figure 4:
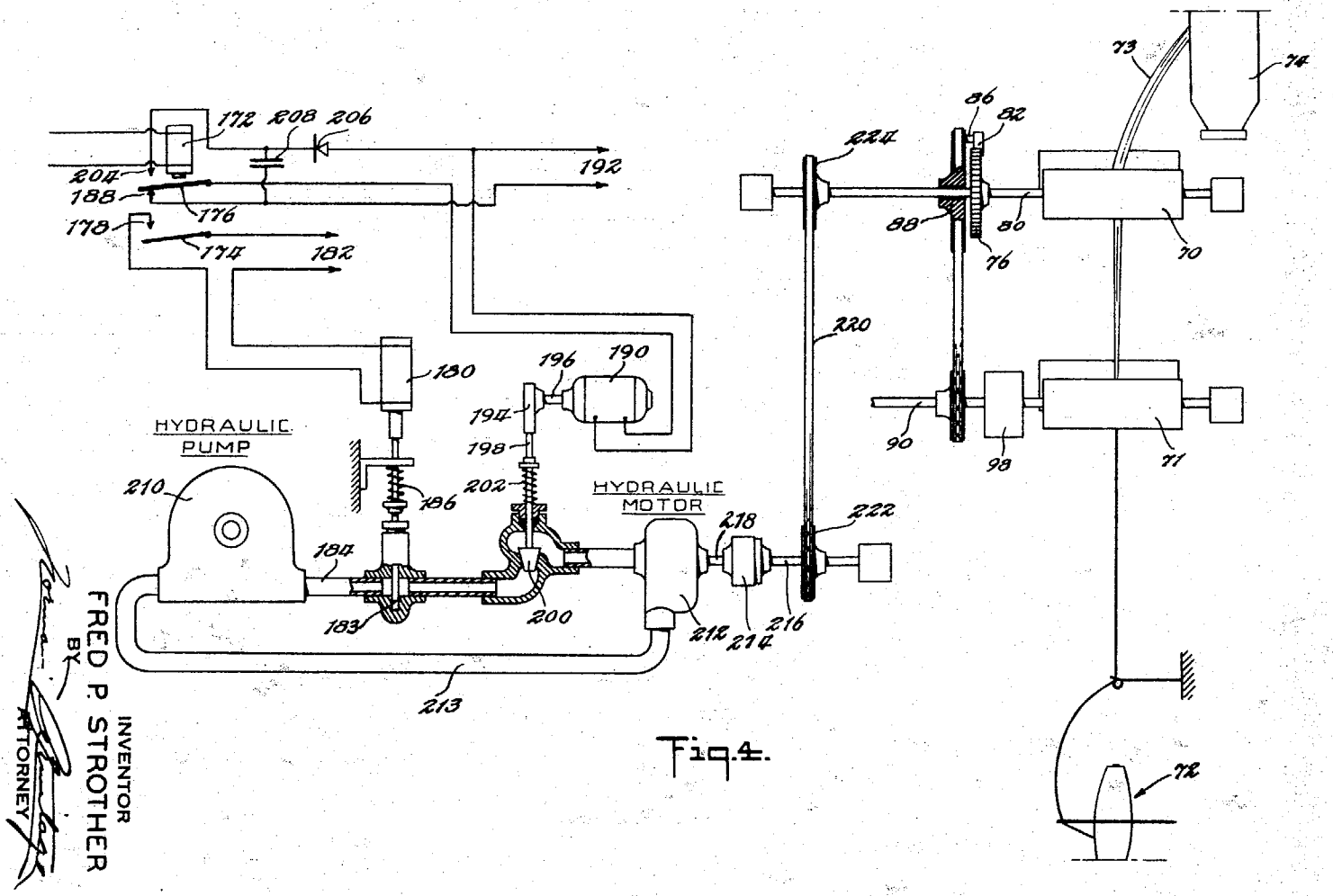
Fig. 4 illustrates a control system wherein controls signals of random occurrence and of random duration are converted into corresponding signals having a third randomly varying characteristic; the system being shown as applied to slub injection to obtain slubs in yarn of random occurrence, random length, and of random diameter.

In the embodiments of the invention so far described the produced signals are of random occurrence and of random duration. If it is desired that the control signals have a third variable characteristic, for example magnitude, the circuits of Figs. 1 to 3 may be readily modified in accordance with the arrangement of Fig. 4 to which reference may now be had. In Fig. 4 wherein control of slub injection mechanism is illustrated, a relay 172 is energized at random intervals and for periods of random duration. The energizing circuit of relay 172 is not shown as it may be either of those of relay 45 of Figs. 1 and 2 or that of relay 162 of Fig. 3. Two armatures, 174 and 176 are associated with relay 172. Over armature 174 and front contact 178 relay 172 controls the circuit of a solenoid 180, the solenoid being energized from any suitable source connected to terminals indicated at 182 whenever relay 172 is energized. Energization of the solenoid 180 opens a gate valve 183 in a fluid supply line 184 against the action of a biasing spring 186, the valve being normally completely closed and moved to full open position when solenoid 180 is energized. Over armature 176 and back contact 188, relay 172 controls the circuit of a small alternating current motor 190, motor 190 receiving current during the periods of deenergization of relay 172 from any suitable source of alternating current connected to terminals 192. A cam disk 194, which is mounted eccentrically on the shaft 196 of motor 190, engages the upper end of the valve stem 198 of a variable orifice valve 200 in the line 184 to vary the position of the movable member of the valve continuously during periods of energization of the motor 190, a compression spring 202 serving to maintain the valve stem 198 in engagement with the cam disk 194. A front contact 204 associated with armature 176 is connected through a rectifier 206 with that one of the terminals 192 connected with the motor 190 and a condenser 208 is bridged across contacts 188 and 204. Thus when relay 172 lifts its armatures, the surge of current through the motor resulting from discharge of condenser 208 effectively stops the motor and the valve 200 is held stationary for the duration of the control signal.

The valves 183 and 200 are interposed in the line 184 between an accumulator type hydraulic pump 210 and an hydraulic motor 212. The fluid return line is indicated at 213. An overriding clutch 214 couples a stub shaft 216 to the shaft 218 of motor 212. The drive shaft 80 of the feed rolls 70 of the yarn spinning and drafting mechanism is coupled to stub shaft 216 through a chain 220 engaging sprocket wheels 222 and 224 on shafts 216 and 80, respectively. Shaft 80, except during period of slub injection, is driven, as in Fig. 1, from the main drive shaft 90 of the spinning mechanism through the overriding clutch comprising sprocket 88, pawl 82 and ratchet wheel 76.

With the above described control system of Fig. 4, during the intervals between control signals, that is between periods of energization of relay 172, the feed rolls are driven at a constant speed, valve 183 is in closed position and hence motor 212 is idle while motor 190 is energized causing valve stem 198 to be reciprocated at a relatively slow rate. When relay 172 becomes energized, it picks up its armatures, opening the circuit of motor 190 at contact 188, braking the motor at contact 204 and closing the circuit of solenoid 180 at contact 178. Operating fluid is then delivered to motor 212 through valves 183 and 200 and this motor will drive shaft 218 at a rate determined by the particular setting of valve 200 occurring at the moment of stoppage of motor 190, which setting remains constant for the duration of the control signal. During such period, the feed rolls 70 are driven from the hydraulic motor at a rate in excess of their normal rate and hence, a slub is injected into the yarn of a length dependent upon the duration of the signal and of a diameter dependent upon the speed of the hydraulic motor 212. As there is no correlation between the rate of reciprocation of the valve stem 198 and the occurrence of a control signal and as the valve stem is not reciprocated during a control signal, the speed of motor 212, and hence, the diameters of the injected slubs, will vary independently of the occurrence and length of the slubs in a purely random manner.

Figures 5, 5A:
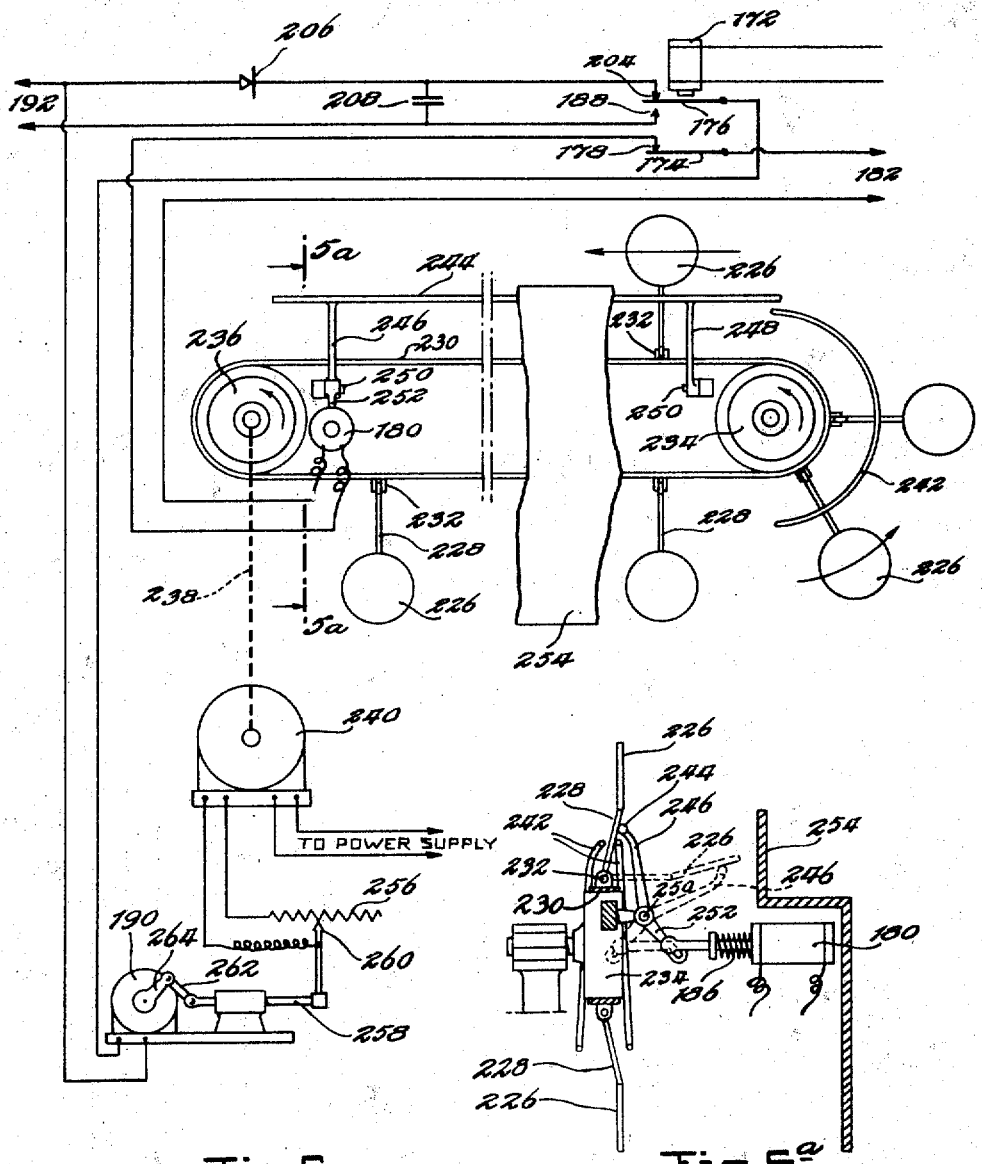
Fig. 5 illustrates the system of Fig. 4 as applied to the control of targets in a shooting gallery.
Fig. 5a is a section on the line 5a—5a of Fig. 5.

In Fig. 5 the control system of Fig. 4 is utilized for control of targets in a shooting gallery. The control system causes the targets to appear at random intervals and at random locations, to remain in view for periods of random duration and to travel at random rates. The targets are indicated at 226 and may have any desired configuration. For simplicity of illustration the targets have been shown as flat disks. Each target has a supporting rod 228 which may be integral therewith and preferably disposed at an angle thereto as shown in Fig. 5a. The support rods are pivotally mounted in any suitable manner on a narrow endless belt 230 so as to be freely oscillatable about an axis parallel to the longitudinal axis of the belt. For example the ends of the rods 228 may be looped about staples 232 longitudinally disposed along the belt and secured thereto with their central stretches spaced therefrom to allow free pivotal motion of the rods 228. The endless belt 230 passes around an idler roller 234 and a driven roller 236. Roller 236, as diagrammatically indicated by the dashed line 238, is driven by a variable speed electric motor 240 so as to be rotated thereby in the direction of the arrow. Adjacent to idler roller 234 is a pair of fixed guide rails 242 for reception therebetween of the rods 228 during travel around the roll 234, the rails 242, at their lowermost ends being widely spaced to insure entrance of the depending rods 228 therebetween and at their upper ends converging to guide the rods into the angular position shown in Fig. 5a. A movable guide rail 244, extending parallel with the upper reach of the belt 230 is supported at its ends by arms 246 and 248 which are pivotally mounted on pins 250 for oscillation about an axis parallel to the direction of travel of the belt. Arm 246 forms one arm of a bell crank lever, the other arm of which is indicated by the reference numeral 252. The position of arm 252 is controlled by the solenoid 180 which, when energized, rocks the arm against the action of the compression spring 186 into the position illustrated in full lines in the drawing. In this position rail 244 is substantially above the level of the upper stretch of belt 230 and hence, any targets 226 on the upper stretch of the belt will be held substantially vertically by engagement of the rods 228 with the rail 244. When the solenoid is deenergized, spring 186 moves the arm 252 into the position shown in dotted lines in Fig. 5a, permitting the targets to drop forward by gravity onto the retracted rail 244. Thus, upon occurrence of a control signal, such targets as are on the upper stretch of the belt are raised by rail 244 into position where they will be visible over the top of a suitable screen indicated in Fig. 5a at 254. To avoid confusion in the drawing, screen 254 has been only partly shown in Fig. 5. It will be understood that the screen would be wide enough to obscure the rollers and guide rails from the view of one shooting at the targets travelling along the upper stretch of the belt. The targets will remain in view for the duration of the control signal, provided they are still on the upper stretch of the belt. Their rate of travel, while in view, will depend upon the speed of motor 240 at the moment of initiation of the control signal. The control of the speed of motor 240, which corresponds to the control of the modulating valve 200 of Fig. 4, is through motor 190 which, when energized over back contact 188 of relay 172 continuously varies a resistance 256 in the circuit of motor 240. As indicated diagrammatically in the drawing, resistance 256 is varied by means of a rod 258 carrying a movable contact 260 and reciprocated through the link 262 and crank 264 driven by motor 190, contact 260 and one end of resistor 256 being connected in the circuit of motor 240, for example in series with the field winding. Thus, the control system of Fig. 5, like that of Fig. 4 provides three randomly varying characteristics, specifically, occurrence, duration and rate of travel. In Fig. 5 a fourth substantially random characteristic is introduced, namely position, that is, the position of a target along the upper stretch of belt 230 at the moment it is a control signal. This characteristic depends, raised into view as a result of the occurrence of of course, on the distribution of the targets and becomes of increasing importance as the number of targets is decreased. It will be understood that the rail 244 is positioned adjacent the belt and between it and the firing line so that when a target is hit it is knocked away from the rail and falls by gravity toward the other side of the belt.

Figure 6:
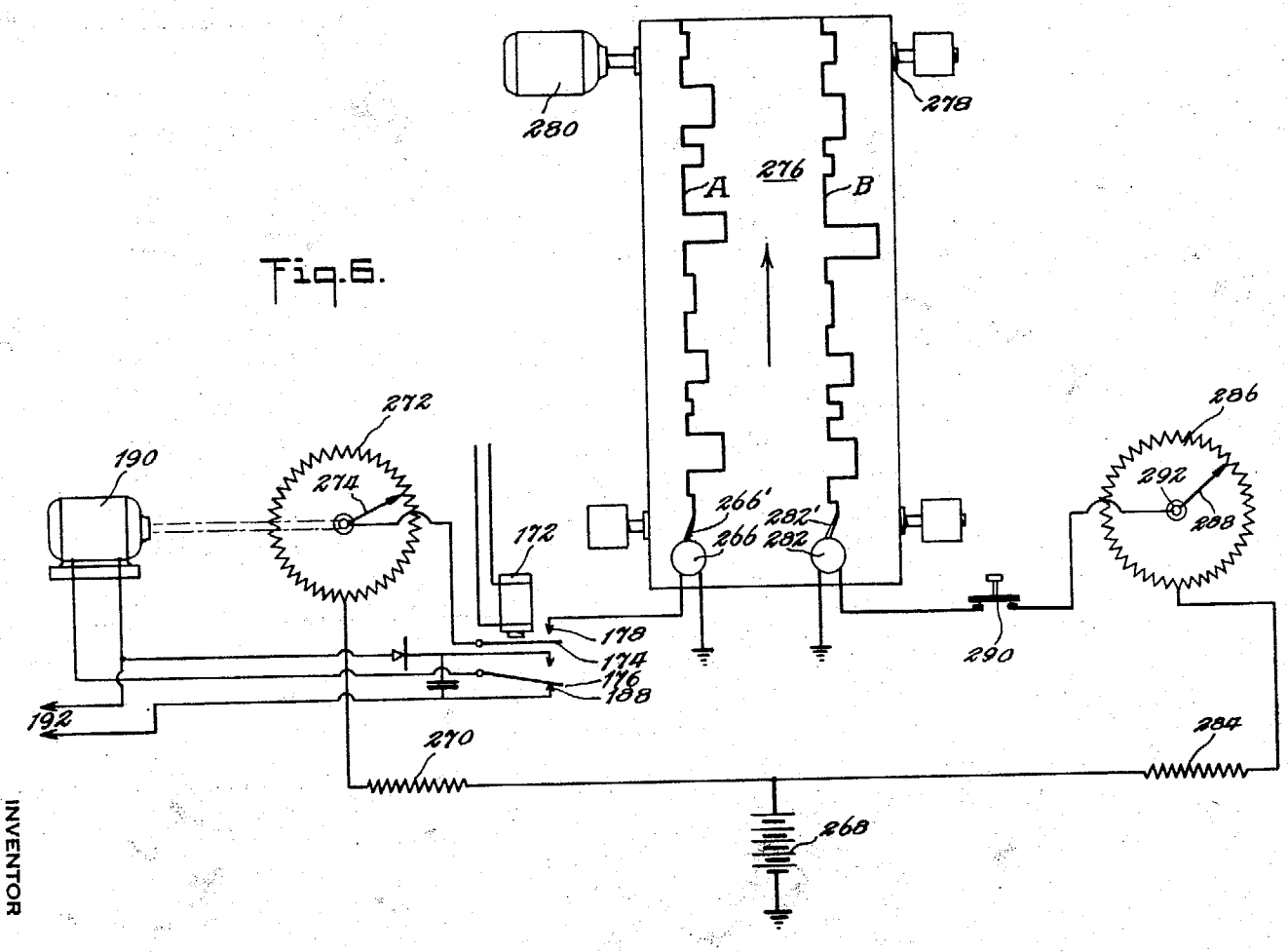
Fig. 6 illustrates the control system of Fig. 4 applied for testing speed of response and coordination of individuals.

Still another embodiment of the invention wherein control signals of randomly varying characteristics are obtained and utilized is disclosed in Fig. 6 wherein the system provides a test of quickness of response and perception of an individual. In the system of Fig. 6 a pen motor 266 is energized at random intervals for periods of random duration and with current of random magnitude. The circuit of the pen motor may be traced as follows: from the positive terminal of a battery 268, through a fixed resistor 270, through two sections of a resistor 272 in parallel and movable contact arm 274 to the armature 174 of relay 172, front contact 178, the winding of the pen motor to the other terminal of battery 268, indicated as ground. Arm 274 is continuously rotated by motor 190 during intervals of deenergization of relay 172, motor 190 being energized as in Figs. 4 and 5 over back contact 188 of relay 172. Thus, with relay 172 energized at random intervals and for periods of random duration, pen motor 266 will be energized concurrently with the relay, but the magnitude of the energizing current during any period of energization will depend upon the angular position of arm 274 at the moment of energization of relay 172. The pen 266' of pen motor 266 is positioned over a scaled paper 276 which is moved under the pen in the direction of the arrow by rotation of a drum 278 upon which the paper is wound. Drum 278 is driven at a constant rate by any suitable means, indicated in the drawing as a motor 280. The track of the pen 266' is indicated at A.

In order to test the quickness of response of an individual a second pen motor 282 is provided and positioned with its pen 282' over the sheet 276. The circuit of motor 282 is similar to that of motor 266 but is controlled manually, rather than automatically. As shown, the circuit includes a resistor 284, two variable portions of a resistor 286 in parallel, manually adjustable contact arm 288 and push button switch 290 all connected in series between the battery 268 and the winding of the pen motor. Thus an operator can press the key 290 when he sees the pen 266' start to swing and adjust the arm 288 as by a knob 292, to increase or decrease the swing of pen 282' in accordance with the deflection of pen 266' and thus attempt to cause the pen 282' to duplicate the track A. The track B, made by pen 282', can be compared with the track A to determine from a suitable longitudinal scale (not shown) along the sheet 276, the time of response of the individual, both at the beginning and end of a control signal and also to determine from the magnitudes of corresponding deflections, the coordination or accuracy of perception of the individual. Various other arrangements for utilizing the control signals produced in accordance with the invention for test purposes will be apparent to those skilled in the art.

The invention has now been described with reference to various embodiments thereof and has been illustrated as applied to injection of slubs into yarn, to control of targets in a shooting gallery and to testing of individuals. Various other fields of use for the novel control system of the invention will occur to those skilled in the art. In each embodiment of the invention control pulses of random occurrence are converted into control signals of random occurrence and of random duration either through the intermediary of a cyclically varying element as in Figs. 1 and 2 or by selection of random pulses, as in Fig. 3.

In the embodiments of the invention illustrated in Figs. 4, 5 and 6, means, including an element cyclically varying during intervals between control signals, are provided for converting the control signals produced in accordance with the system of Figs. 1, 2 or 3, into signals suitable for controlling, in addition to occurrence and duration a third characteristic of an element. In Fig. 4 such third characteristic is the diameter of the injected slubs; in Fig. 5 the third characteristic is the rate of travel of the target and in Fig. 6 the third characteristic is the magnitude of the current to a pen motor.

In each embodiment of the invention the initial source of random pulses has been indicated as one or a plurality, of counter tubes actuated by cosmic radiation. Any source of inherently random phenomena that can be converted into pulses occurring at random intervals could be employed in the control system of the present invention. The invention, broadly speaking, is concerned with the conversion of random pulses emanating from any source into signals of random occurrence and duration, such signals being suitable for control of at least two independently variable characteristics. It is preferred that this source of pulses be one actuated by random reception of radiation, and the preferred control signals into which the pulses are converted are signals suitable for use in the control of slub-inserting mechanisms. Obviously, various changes could be made in the particular circuits shown in the drawings and in the elements controlled thereby without departing from the spirit of the invention.

In Figs. 1, 2 and 4 the control system has been indicated as controlling the injection of slubs into yarn by increase of the rate of rotation of the feed rolls of a yarn spinning and drafting mechanism to reduce the draft thereof. It will be understood that the draft could be reduced without increase of rate of feed roll rotation, for example by change in ratch length, or by decrease in rate of rotation of the draft rolls or by change of location of feed of the roving into the ratch in the case of conical feed rolls and that slubs could be injected into yarn without change of draft, for example by the addition of loose fibers to the roving. Also slubs could be injected into continuous filament yarn during extrusion or spinning thereof or during stretch breaking and drafting thereof. Accordingly, so far as slub injection is concerned, the invention provides a method and means for so controlling an element affecting the diameter of yarn during the production thereof that the resultant yarn will have slubs of random length therein at random intervals and with, if desired random diameter. Although the system of Fig. 3, has not been illustrated as used for control of any specific mechanism and those of Figs. 5 and 6 have been illustrated as applied to the control of specifically different mechanisms, obviously elements of slub injecting mechanisms could be controlled by the systems disclosed in these figures. In Fig. 3, the circuit controlled by relay 162 could be that of the magnetic clutch of the slub injecting mechanism of Fig. 1, or that of the solenoid 180 of the slub injecting mechanism of Fig. 4 or that of any solenoid, adapted when energized to control injection of a slub. In Fig. 5 the solenoid 180 could control the magnetic clutch of Fig. 1 and motor 240 could drive the shaft 69 of Fig. 1. In Fig. 6 the pen motor 266 could be replaced by a solenoid controlling the location axially along conical feed rolls of a trumpet through which roving is fed to the feed rolls of a drafting mechanism. Other specific applications of the control systems of Figs. 1 to 6, with respect to slub injection and with reference to other fields of use will occur to those skilled in the art.

The following is claimed:

1. The method of producing control signals which comprises utilizing a source of inherently random phenomena to create randomly occurring pulses, controlling the initiation of a series of control signals by said pulses, [separately] creating a second series of control pulses *independent in time of the first mentioned series of pulses* and terminating said control signals in response to said second series of pulses to create control signals of random duration and of random occurrence.

2. The method according to claim 1 which includes varying an element affecting the magnitude of the control signals during intervals between signals whereby the randomly occurring control signals of random duration have a random magnitude.

3. The method according to claim 2 including holding the element constant during control signals whereby the magnitude of a control signal is substantially constant for the duration of that signal.

4. The method according to claim 1 including preventing initiation of a control signal for a predetermined period following termination of a control signal, to insure a minimum interval between control signals.

5. The method of producing control signals which comprises utilizing a source of inherently random phenomena to create randomly occurring pulses, controlling the initiation of a series of control signals by said pulses, and continuously activating an element effective to terminate control signals at predetermined intervals to produce control signals of random duration and of random occurrence.

6. The method of producing control signals which comprises utilizing inherently random phenomena to create two independent series of randomly occurring pulses, controlling the initiation of control signals by one of the series of pulses and controlling the termination of the control signals by the other series of pulses to produce control signals of random duration and of random occurrence.

7. The method of controlling energization of a circuit controlling device having a holding circuit which comprises utilizing inherently random phenomena to create a series of pulses, initiating energization of the device in response to the pulses by closure of an energizing circuit of the device, and breaking the holding circuit of the device at another point at intervals independent of the time initiation of energization of the device whereby said device is energized at random intervals for periods of random duration.

8. The method according to claim 7 in which breaking of the holding circuit is done at regular intervals.

9. The method according to claim 7 which includes utilizing random phenomena to create a second series of pulses of random occurrence and wherein the breaking of the holding circuit is done in response to said second series of pulses.

10. The method of controlling circuits which comprises creating a series of pulses in response to reception of cosmic rays, closing the pick-up circuit of a circuit controlling device in response to the created pulses, creating a second series of pulses *independent in time of the first mentioned series of pulses* and breaking a holding circuit of the device in response to said second series of pulses whereby circuits will be controlled by said device at random intervals and for periods of random duration.

11. The method according to claim 10 including continuously varying an element in a circuit controlled by the device during periods of deenergization of the device whereby the condition of the circuit controlled by the device will depend, at the moment of energization of the device, upon the condition of the element at that moment.

12. The method according to claim 10 in which the second series of pulses occur at regular intervals.

13. The method according to claim 10 wherein said second series of pulses are created in response to reception of cosmic rays.

14. The method of producing a novelty yarn which comprises utilizing inherently random phenomena to create a series of pulses, separated by intervals of random duration, initiating control signals in response to the created pulses, creating a second series of pulses, terminating said control signals in response to said second series of pulses and finally controlling an element affecting the diameter of yarn during production in response to the control signals.

15. The method according to claim 14 which includes preventing said element from affecting the diameter of yarn during intervals between control signals and continuously varying said element during such intervals whereby the magnitude of change in the diameter of the yarn effectible by the element during any control signal depends upon the condition of said element at the moment of initiation of that signal.

16. The method of producing yarn having slubs of random length at random intervals therein which comprises utilizing inherently random phenomena to create a series of pulses separated by intervals of random duration, initiating control signals in response to the created pulses, creating a second series of pulses, terminating the control signals in response to said second series of pulses, and actuating slub injecting mechanism during each control signal.

17. The method according to claim 16 including continuously varying an element of the slub injecting mechanism affecting the diameter of the injected slubs during periods between control signals whereby the diameters as well as the lengths of the randomly injected slubs will vary randomly.

18. The method of producing novelty yarn which comprises creating a series of pulses in response to reception of cosmic rays, initiating control signals in response to the created pulses, creating a second series of pulses, terminating said signals in response to said second series of pulses and finally controlling an element affecting the diameter of yarn during production in response to the control signals.

19. A control system comprising in combination a device actuated in response to inherently random phenomena, means responsive to actuation of said device for creating a series of randomly occurring pulses, means responsive to said pulses for initiating a series of control signals, means for creating a second series of pulses *independent in time of the first mentioned series of pulses* and means for terminating said signals in response to said second series of pulses whereby the control signals will be of random occurrence and of random duration.

20. A control system comprising in combination a device actuated in response to inherently random phenomena, means responsive to actuation of said device for creating a series of electrical pulses, a relay having a pick-up circuit and a holding circuit, the latter being adapted to be closed upon energization of the relay, means controlled by said pulses for closing the pick-up circuit of said relay, and means independent of said pulses for opening the holding circuit of the relay at intervals whereby said relay is energized at random intervals for periods of random duration.

21. The control system according to claim 20 including means for preventing closure of the pick-up circuit for a predetermined time following opening of the holding circuit.

22. The control system according to claim 20 wherein the last mentioned means of said claim comprises a driven member adapted to open the holding circuit of the relay at predetermined intervals of time.

23. The control system according to claim 20 wherein the last mentioned means of said claim includes a second device actuated in response to inherently random phenomena, means responsive to actuation of said second device for creating a second series of electrical pulses independent of the first mentioned series and a switch in said holding circuit controlled in response to said second series of pulses.

24. The control system according to claim 20 including separate circuits closed over front and back contacts of said relay, a variable element, and means in one of said circuits for continuously varying said element when the circuit is energized, whereby closure of the other of said circuits by said relay may be used to initiate an event at random intervals and to maintain the event for periods of random duration and the condition of said element may be used to give the event a random characteristic.

25. A control system comprising in combination a plurality of counter tubes adapted to be discharged by reception of cosmic rays, a coincident circuit connected to said tubes to transmit pulses only when tubes of a certain combination of said tubes are coincidently discharged, means for initiating control signals upon transmission of pulses by said circuit, a second coincident circuit connected to said tubes to transmit pulses only when tubes of a certain other combination of said tubes are coincidently discharged and means responsive to pulses transmitted by said second coincident circuit for terminating control signals initiated by said first mentioned pulses whereby control signals of random occurrence and of random duration are obtained.

26. A control system for injecting slubs into yarn comprising a source of inherently random phenomena, means for converting phenomena from said source into a series of randomly occurring pulses, means responsive to said pulses for initiating a series of control signals, means for creating a second series of pulses, means for terminating said signals in response to said second series of pulses and means controlled by the control signals for injecting slubs into yarn.

27. A control system for injecting slubs into yarn comprising means responsive to the reception of cosmic rays for creating a series of pulses, means for initiating control signals in response to the created pulses, means independent of the last mentioned means for terminating said signals and means controlled by the control signals for injecting slubs into yarn.

28. The control system according to claim 27 including a relay having pick-up and holding circuits, said pulses controlling said pick-up circuit and said terminating means controlling said holding circuit, and said relay when energized effecting the injection of slubs.

29. The control system according to claim 28 wherein said terminating means comprises a switch in said holding circuit and a rotating cam adapted to open said circuit at intervals.

30. The control system according to claim 27 wherein said last mentioned means includes a rotating shaft and a shaft adapted to be coupled thereto, said shafts, when coupled, operating to insert into yarn a slub of a diameter dependent upon the rate of rotation of said rotating shaft and a magnetic clutch for coupling said shafts together, said control signals causing energization of said clutch and thereby operating to inject slubs of random length into yarn at random intervals.

31. The control system according to claim 27 including means responsive to the termination of a control signal for preventing initiation of a succeeding control signal for a predetermined interval whereby there will be a predetermined minimum length of yarn between slubs.

32. Apparatus for producing yarn having slubs of random length at random intervals therein comprising in combination, a source of inherently random phenomena, means for converting phenomena from said source into a series of randomly occurring pulses, a normally deenergized electronic tube connected for energization during occurrence of a pulse, a relay and an energizing circuit therefor, a switch in said circuit adapted to be closed only during energization of said tube, a holding circuit for said relay, means for opening said holding circuit at intervals, a yarn spinning mechanism and means associated therewith and responsive to energization of said relay for injecting slubs into yarn spun by said mechanism.

33. The combination according to claim 32 wherein said yarn spinning mechanism includes a drafting unit having a pair of feed rolls and means for driving said rolls at a constant peripheral speed and wherein the last mentioned means of said claim include auxiliary drive means adapted when actuated to increase the peripheral speed of said rolls, and an electromagnetic device controlled by said relay for actuating said auxiliary means.

34. The combination according to claim 33 wherein said auxiliary drive means includes an hydraulic motor and a source of fluid under pressure for driving said motor, valve means between said source and said motor, said electromagnetic device opening said valve in response to energization of said relay, said combination including a modulating valve between said source of fluid and said motor for controlling the rate of rotation of said motor when actuated by the opening of said first mentioned valve, and means controlled over a back contact of said relay for continuously varying the throttling effect of said modulating means whereby the injected slubs will be of random diameter.

*35. The method of producing a novelty yarn which comprises creating a series of control signals separated by intervals of varying duration, controlling an element affecting the diameter of yarn during production in response to the control signals, preventing said element from affecting the diameter of yarn during intervals between control signals and continuously varying said element to vary the magnitude of change in diameter of the yarn effectible by the element upon occurrence of a control signal.*

*36. The method of producing a novelty yarn having slubs of varying diameter therein which comprises creating a series of control signals of varying length separated by intervals of varying duration, controlling actuation of slub injecting mechanism by the created control signals and automatically varying an element of the slub injecting mechanism affecting the diameter of the injected slubs whereby the diameter of the injected slubs depend upon the condition of the element during actuation of the mechanism in response to the control signals.*

*37. A control system for injecting slubs of varying diameter into yarn comprising means for creating a series of control signals separated by intervals of varying duration, mechanism adapted when actuated to insert a slub into yarn, said mechanism including a variable element the condition of which upon actuation of the mechanism determines the diameter of the injected slub,*

*means automatically varying the condition of said element and means responsive to the created control signals for actuating said mechanism whereby the diameter of the injected slub will vary in accordance with the condition of said element during control signals.*

*38. The control system according to claim 37, including means responsive to said control signals for rendering inoperative for the duration of each signal said means for automatically varying the condition of said element.*

*39. A control system for injecting slubs into yarn comprising means for creating a series of control signals of varying length separated by intervals of varying duration, a rotating shaft, a shaft adapted to be coupled to said rotating shaft, said shafts when coupled operating to inject into yarn a slub of a diameter dependent upon the rate of rotation of said rotating shaft, a clutch for coupling said shafts together, and means for controlling said clutch by said control signals whereby slubs of lengths determined by the*

*lengths of said signals, spaced in accordance with the intervals between signals and of diameters determined by the rates of rotation of said rotatable shaft will be inserted into yarn.*

FRED P. STROTHER.

References Cited in the file of this patent or the original patent

UNITED STATES PATENTS

| Number | Name | Date |
|---|---|---|
| 1,144,051 | Okamoto | June 22, 1915 |
| 2,237,122 | Swan et al. | Apr. 1, 1941 |
| 2,339,750 | Bartholy | Jan. 25, 1944 |
| 2,434,948 | Miller | Jan. 27, 1948 |
| 2,538,536 | Ritchie et al. | Jan. 16, 1951 |

FOREIGN PATENTS

| Number | Country | Date |
|---|---|---|
| 493,632 | Great Britain | Oct. 12, 1938 |
| 493,974 | Great Britain | Oct. 18, 1938 |